US008587583B2

(12) United States Patent
Newcombe et al.

(10) Patent No.: US 8,587,583 B2
(45) Date of Patent: Nov. 19, 2013

(54) THREE-DIMENSIONAL ENVIRONMENT RECONSTRUCTION

(75) Inventors: Richard Newcombe, Nuneaton (GB); Shahram Izadi, Cambridge (GB); David Molyneaux, Oldham (GB); Otmar Hilliges, Cambridge (GB); David Kim, Cambridge (GB); Jamie Daniel Joseph Shotton, Cambridge (GB); Stephen Edward Hodges, Cambridge (GB); David Alexander Butler, Cambridge (GB); Andrew Fitzgibbon, Cambridge (GB); Pushmeet Kohli, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 13/017,690

(22) Filed: Jan. 31, 2011

(65) Prior Publication Data

US 2012/0194516 A1    Aug. 2, 2012

(51) Int. Cl.
*G06T 17/05* (2011.01)
*G06T 19/00* (2011.01)

(52) U.S. Cl.
USPC .......................... 345/420; 345/422; 345/424

(58) Field of Classification Search
None
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |

(Continued)

FOREIGN PATENT DOCUMENTS

| CN | 201254344 B | 6/2010 |
| EP | 0583061 A2 | 2/1994 |

(Continued)

OTHER PUBLICATIONS

Ray casting, Wikipedia, Feb. 5, 2008.*

(Continued)

*Primary Examiner* — Daniel Hajnik
*Assistant Examiner* — Jason Pringle-Parker
(74) *Attorney, Agent, or Firm* — Zete Law, P.L.L.C.; MacLane C. Key

(57) ABSTRACT

Three-dimensional environment reconstruction is described. In an example, a 3D model of a real-world environment is generated in a 3D volume made up of voxels stored on a memory device. The model is built from data describing a camera location and orientation, and a depth image with pixels indicating a distance from the camera to a point in the environment. A separate execution thread is assigned to each voxel in a plane of the volume. Each thread uses the camera location and orientation to determine a corresponding depth image location for its associated voxel, determines a factor relating to the distance between the associated voxel and the point in the environment at the corresponding location, and updates a stored value at the associated voxel using the factor. Each thread iterates through an equivalent voxel in the remaining planes of the volume, repeating the process to update the stored value.

20 Claims, 8 Drawing Sheets

(56) References Cited

U.S. PATENT DOCUMENTS

| | | | |
|---|---|---|---|
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,696,591 A | 12/1997 | Bilhorn et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,084,979 A * | 7/2000 | Kanade et al. | 382/154 |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,405,151 B1 * | 6/2002 | Fujii et al. | 702/155 |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,504,569 B1 | 1/2003 | Jasinschi et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,940,538 B2 | 9/2005 | Rafey et al. | |
| 6,950,534 B2 | 9/2005 | Cohen et al. | |
| 7,003,134 B1 | 2/2006 | Covell et al. | |
| 7,034,818 B2 | 4/2006 | Perry et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,098,435 B2 * | 8/2006 | Mueller et al. | 250/208.1 |
| 7,113,918 B1 | 9/2006 | Ahmad et al. | |
| 7,121,946 B2 | 10/2006 | Paul et al. | |
| 7,135,992 B2 | 11/2006 | Karlsson et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,257,237 B1 * | 8/2007 | Luck et al. | 382/103 |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,366,325 B2 | 4/2008 | Fujimura et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,525,543 B2 * | 4/2009 | Engel | 345/426 |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,583,275 B2 | 9/2009 | Neumann et al. | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |

(56) References Cited

U.S. PATENT DOCUMENTS

| | | | |
|---|---|---|---|
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,697,748 B2 | 4/2010 | Dimsdale et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,023,726 B2* | 9/2011 | Sundaresan et al. | 382/154 |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2002/0024517 A1* | 2/2002 | Yamaguchi et al. | 345/424 |
| 2002/0186216 A1* | 12/2002 | Baumberg et al. | 345/422 |
| 2003/0067461 A1 | 4/2003 | Fletcher et al. | |
| 2004/0023612 A1* | 2/2004 | Kriesel | 452/157 |
| 2004/0075738 A1 | 4/2004 | Burke et al. | |
| 2004/0167667 A1 | 8/2004 | Goncalves et al. | |
| 2004/0233287 A1 | 11/2004 | Schnell | |
| 2005/0238200 A1 | 10/2005 | Gupta et al. | |
| 2006/0006309 A1* | 1/2006 | Dimsdale et al. | 250/206.1 |
| 2006/0221250 A1 | 10/2006 | Rossbach et al. | |
| 2007/0052807 A1 | 3/2007 | Zhou et al. | |
| 2007/0116356 A1 | 5/2007 | Gong et al. | |
| 2007/0156286 A1 | 7/2007 | Yamauchi | |
| 2008/0026838 A1 | 1/2008 | Dunstan et al. | |
| 2008/0055308 A1* | 3/2008 | Dekel et al. | 345/421 |
| 2008/0060854 A1 | 3/2008 | Perlin | |
| 2008/0152191 A1 | 6/2008 | Fujimura et al. | |
| 2008/0304707 A1 | 12/2008 | Oi et al. | |
| 2010/0085352 A1 | 4/2010 | Zhou et al. | |
| 2010/0085353 A1 | 4/2010 | Zhou et al. | |
| 2010/0094460 A1 | 4/2010 | Choi et al. | |
| 2010/0098328 A1 | 4/2010 | Se et al. | |
| 2010/0103196 A1 | 4/2010 | Kumar et al. | |
| 2010/0111370 A1 | 5/2010 | Black et al. | |
| 2010/0278384 A1 | 11/2010 | Shotton et al. | |
| 2010/0281432 A1 | 11/2010 | Geisner et al. | |
| 2010/0302395 A1 | 12/2010 | Mathe et al. | |
| 2011/0170756 A1* | 7/2011 | Schneider | 382/131 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

U.S. Appl. No. 12/367,665, filed Feb. 9, 2009, "Camera Based Motion Sensing System".

U.S. Appl. No. 12/790,026, filed May 28, 2010, "Foreground and Background image Segmentation".

U.S. Appl. No. 12/877,595, filed Sep. 8, 2010, "Depth Camera Based on Structured Light and Stereo Vision".

Baltzakis, et al., "Tracking of human hands and faces through probabilistic fusion of multiple visual cues", retrieved on Nov. 28, 2010 at

(56) References Cited

OTHER PUBLICATIONS

<<http://citeseerx.ist.psu.edu/viewdoc/download?doi=10.1.1.158.8443&rep=rep1&type=pdf>>, IEEE, Intl Conference on Computer Vision Systems (ICVS), Santorini, Greece, May 2008, pp. 1-10.
Benko, et al., "Depth Touch: Using Depth-Sensing Camera to Enable Freehand Interactions on and Above the Interactive Surface", retrieved on Nov. 28, 2010 at <<http://research.microsoft.com/en-us/um/people/benko/publications/2008/DepthTouch_poster.pdf>>, IEEE Tabletops and Interactive Surfaces, Amsterdam, the Netherlands, Oct. 2008, pp. 1.
Besl, et al., "A Method for Registration of 3-D Shapes", IEEE Transactions on Pattern Analysis and Machine Intelligence, vol. 14, No. 2, Feb. 1992, pp. 239-256.
Blais, et al., "Registering Multiview Range Data to Create 3D Computer Objects", IEEE Transactions on Pattern Analysis and Machine Intelligence, vol. 17, No. 8, Aug. 1995, pp. 820-824.
Boehnke, "Fast Object Localization with Real Time 3D Laser Range Sensor Simulation", retrieved on Nov. 24, 2010 at <<http://www.wseas.us/e-library/transactions/electronics/2008/Paper%204%20BOEHNKE.pdf>>, WSEAS Transactions on Electronics, vol. 5, No. 3, Mar. 2008, pp. 83-92.
Bolitho, et al., "Parallel Poisson Surface Reconstruction", retrieved on Nov. 29, 2010 at <<http://www.cs.jhu.edu/~misha/MyPapers/ISVC09.pdf>>, Springer-Verlag Berlin, Proceedings of Intl Symposium on Advances in Visual Computing: Part I (ISVC), Nov. 2010, pp. 678-689.
Bolitho, "The Reconstruction of Large Three-dimensional Meshes", retrieved on Nov. 29, 2010 at <<http://www.cs.jhu.edu/~misha/Bolitho/Thesis.pdf>>, Johns Hopkins University, PhD Dissertation, Mar. 2010, pp. 1-171.
Botterill, et al., "Bag-of-Words-driven Single Camera SLAM", retrieved on Nov. 26, 2010 at <<http://www.hilandtom.com/tombotterill/Botterill-Mills-Green-2010-BoWSLAM.pdf>>, Journal on Image and Video Processing, Aug. 2010, pp. 1-18.
Broil, et al., "Toward Next-Gen Mobile AR Games", retrieved on Nov. 24, 2010 at <<http://ieeexplore.ieee.org/stamp/stamp.jsp?tp=&arnumber=4557954>>, IEEE Computer Society, IEEE Computer Graphics and Applications, vol. 28, No. 4, 2008, pp. 40-48.
Campbell, et al., "Automatic 3D Object Segmentation in Multiple Views using Volumetric Graph-Cuts", Butterworth-Heinemann, Newton, MA, Image and Vision Computing, vol. 28, No. 1, Jan. 2010, pp. 14-25.
Carmody, "How Motion Detection Works in Xbox Kinect", retrieved on Nov. 29, 2010 at <<http://gizmodo.com/5681078/how-motion-detection-works-in-xbox-kinect>>, Gizmo.com. Nov. 3, 2010, pp. 1-4.
Chen, et al., "Object Modeling by Registration of Multiple Range Images", IEEE Proceedings of Intl Conference on Robotics and Automation, Sacramento, California , Apr. 1991, pp. 2724-2729.
Cheung, et al., "Robust Background Subtraction with Foreground Validation for Urban Traffic Video", retrieved on Nov. 28, 2010 at <<http://downloads.hindawi.com/journals/asp/2005/726261.pdf>>, Hindawi Publishing, EURASIP Journal on Applied Signal Processing, vol. 14, 2005, pp. 2330-2340.
Cohen, et al., "Interactive Fluid-Particle Simulation using Translating Eulerian Grids", ACM SIGGRAPH, Proceedings of Symposium on Interactive 3D Graphics and Games (I3D), 2010, pp. 15-22.
Curless, et al., "A Volumetric Method for Building Complex Models from Range Images", ACM SIGGRAPH, Proceedings of Conference on Computer Graphics and Interactive Techniques, New Orleans, LA, Aug. 1996, pp. 303-312.
Cutts, "Matt Cutts: Gadgets, Google, and SEO", retrieved on Nov. 30, 2010 at <<http://www.mattcutts.com/blog/>> Google/SEO, Nov. 2010, 10 pages.
Davison, et al., "Mobile Robot Localisation using Active Vision", Springer, LNCS vol. 1407, No. II, Proceedings of European Conference on Computer Vision, Freiburg, Germany, 1998, pp. 809-825.
de la Escalera, et al., "Automatic Chessboard Detection for Intrinsic and Extrinsic Camera Parameter Calibration", retrieved on Nov. 29, 2010 at <<http://www.mdpi.com/1424-8220/10/3/2027/pdf>>, Sensors, vol. 10, No. 3, 2010, pp. 2027-2044.
Elfes, et al., "Sensor Integration for Robot Navigation: Combining Sonar and Stereo Range Data in a Grid-Based Representation", IEEE, Proceedings of Conference on Decision and Control, Los Angeles, California, Dec. 1987, pp. 1802-1807.
Frahm, et al., "Building Rome on a Cloudless Day", Springer-Verlag Berlin, Proceedings of European Conference on Computer Vision: Part IV (ECCV), 2010, pp. 368-381.
Fujii, et al., "Three-dimensional finger tracking using direct and reflected infrared images", retrieved on Nov. 29, 2010 at <<http://www.acm.org/uist/archive/adjunct/2002/pdf/posters/p27-fujii.pdf>>, ACM, Symposium on User Interface Software and Technology (UIST), Paris, France, Oct. 2002, pp. 27-28.
Furukawa, et al., "Towards Internet-scale Multi-view Stereo", IEEE Computer Society, Proceedings of Conference on Computer Vision and Pattern Recognition (CVPR), San Francisco, California, Jun. 2010, pp. 1434-1441.
Goesele, et al., "Multi-View Stereo Revisited", IEEE Computer Society, Proceedings of Conference on Computer Vision and Pattern Recognition (CVPR), New York, NY, vol. 2, 2006, pp. 2402-2409.
Hadwiger, et al., "Advanced Illumination Techniques for GPU-Based Volume Raycasting", ACM SIGGRAPH, Intl Conference on Computer Graphics and Interactive Techniques, 2009, pp. 1-56.
Harada, "Real-Time Rigid Body Simulation on GPUs", retrieved on Apr. 18, 2011 at <<http.developer.nvidia.com/GPUGems3/gpugems3_ch29.html>>, Nvidia, GPU Gems 3, Chapter 29, 2008, pp. 1-21.
Henry, et al., "RGB-D Mapping: Using Depth Cameras for Dense 3D Modeling of Indoor Environments", ISER, 2010, pp. 1-2.
Herath, et al., "Simultaneous Localisation and Mapping: A Stereo Vision Based Approach", retrieved on Nov. 26, 2010 at <<http://ieeexplore.ieee.org/stamp/stamp.jsp?tp=&amumber=4058480>>, IEEE, Intl Conference on Intelligent Robots and Systems, Beijing, China, Oct. 2006, pp. 922-927.
Hirsch, et al., "BiDi Screen: A Thin, Depth-Sensing LCD for 3D Interaction using Light Fields", retrieved on Nov. 29, 2010 at <<http://src.acm.org/2010/MatthewHirsch/BiDiScreen/BiDi%20Screen.htm>>, ACM SIGGRAPH Asia , Transactions on Graphics (TOG), vol. 28, No. 5, Dec. 2009, pp. 1-7.
Hogue, et al., "Underwater environment reconstruction using stereo and inertial data", retrieved on Nov. 29, 2010 at <<http://ieeexplore.ieee.org/stamp/stamp.jsp?arnumber=04413666>>, IEEE Intl Conference on Systems, Man and Cybernetics, Montreal, Canada, Jan. 2008, pp. 2372-2377.
Jivet, et al., "Real Time Representation of 3D Sensor Depth Images", retrieved on Nov. 28, 2010 at <<http://www.wseas.us/e-library/transactions/electronics/2008/Paper%202%20JIVET.pdf>>, WSEAS Transactions on Electronics, vol. 5, No. 3, Mar. 2008, pp. 65-71.
Kazhdan, et al., "Poisson Surface Reconstruction", Eurographics Symposium on Geometry Processing, 2006, pp. 61-70.
Kil, et al., "GPU-assisted Surface Reconstruction on Locally-Uniform Samples", retrieved on Nov. 29, 2010 at <<http://graphics.cs.ucdavis.edu/~yjkil/pub/psurface/Kil.PS.IMR08.pdf>>, Proceedings of Intl Meshing Roundtable, 2008, pp. 369-385.
Kim, et al., "Relocalization Using Virtual Keyframes for Online Environment Map Construction", retrieved on Nov. 26, 2010 at <<http://www.cs.ucsb.edu/~holl/pubs/Kim-2009-VRST.pdf>>, ACM, Proceedings of Symposium on Virtual Reality Software and Technology (VRST), Kyoto, Japan, Nov. 2009, pp. 127-134.
Klein, et al., "Parallel Tracking and Mapping for Small AR Workspaces", IEEE, Intl Symposium on Mixed and Augmented Reality, Nov. 2007, ISMAR, Nara, Japan, pp. 225-234.
Le Grand, "Broad-Phase Collision Detection with CUDA", retrieved on Apr. 2, 2011 at <<http.developer.nvidia.comIGPUGems3/gpugems3ch32.html>>, Nvidia, GPU Gems 3, Chapter 32, 2008, pp. 1-24.
Levoy, et al., "The Digital Michelangelo Project: 3D Scanning of Large Statues", ACM SIGGRAPH, New Orleans, LA, 2000, pp. 131-144.
Lorensen, et al., "Marching Cubes: A High Resolution 3D Surface Construction Algorithm", Computer Graphics, vol. 21, No. 4, Jul. 1987, pp. 163-169.

(56) References Cited

OTHER PUBLICATIONS

Michel, et al., "GPU-accelerated Real-Time 3D Tracking for Humanoid Locomotion and Stair Climbing", retrieved on Nov. 24, 2010 at <<http://ieeexplore.ieee.org/stamp/stamp.jsp?tp=&arnumber=4399104>>, IEEE, Proceedings of IEEE/RSJ Intl Conference on Intelligent Robots and Systems, San Diego, California, Nov. 2007, pp. 463-469.

Molchanov, et al., "Non-iterative Second-order Approximation of Signed Distance Functions for Any Isosurface Representation", retrieved on Nov. 29, 2010 at <<http://www.paul-rosenthal.de/wp-content/uploads/2010/06/molchanov_eurovis_2010.pdf>>, Blackwell Publishing, Eurographics/ IEEE-VGTC Symposium on Visualization, vol. 29, No. 3, 2010, pp. 1-10.

Newcombe, et al., "Live Dense Reconstruction with a Single Moving Camera", IEEE Computer Society, Proceedings of Conference on Computer Vision and Pattern Recognition (CVPR), 2010, pp. 1498-1505.

Osher, et al., "Level Set Methods and Dynamic Implicit Surfaces, Signed Distance Functions", Springer-Verlag New York, Applied Mathematical Sciences, Chapter 2, 2002, pp. 17-22.

Parker, et al., "Interactive Ray Tracing for Isosurface Rendering", IEEE Computer Society, Proceedings of Conference on Visualization (VIS), 1998, pp. 233-238 and 538.

Pollefeys, et al., "Detailed Real-Time Urban 3D Reconstruction From Video", Kluwer Academic Publishers, International Journal of Computer Vision, vol. 78, No. 2-3, Jul. 2008, pp. 143-167.

Purcell, et al., "Ray Tracing on Programmable Graphics Hardware", ACM Transactions on Graphics, vol. 1, No. 3, Jul. 2002, pp. 268-277.

Rusinkiewicz, et al., "Real-Time 3D Model Acquisition", ACM SIGGRAPH, Proceedings of Conference on Computer Graphics and Interactive Techniques, 2002, pp. 438-446.

Seitz, et al., "A Comparison and Evaluation of Multi-View Stereo Reconstruction Algorithms", IEEE Computer Society, Proceedings of Conference on Computer Vision and Pattern Recognition (CVPR), vol. 1, 2006, pp. 519-528.

Stein, et al., "Structural Indexing: Efficient 3-D Object Recognition", IEEE Transactions on Pattern Analysis and Machine Intelligence, vol. 14, No. 2, Feb. 1992, pp. 125-145.

Stuhmer, et al., "Real-Time Dense Geometry from a Handheld Camera", Springer-Verlag Berlin, LNCS 6376, Conference on Pattern Recognition (DAGM), 2010, pp. 11-20.

Thrun, et al., "Probabilistic Robotics", The MIT Press, Chapter 9, Sep. 2005, pp. 281-335.

van Dam, et al., "Immersive VR for Scientific Visualization: A Progress Report", retrieved on Nov. 24, 2010 at <<http://ieeexplore.ieee.org/stamp/stamp.jsp?tp=&arnumber=888006>>, IEEE Computer Society, IEEE Computer Graphics and Applications, vol. 20, No. 6, Nov. 2000, pp. 26-52.

Vaughan-Nichols, "Game-Console Makers Battle over Motion-Sensitive Controllers", retrieved on Nov. 24, 2010 at <<http://ieeexplore.ieee.org/stamp/stamp.jsp?tp=&arnumber=5197417>>, IEEE Computer Society, Computer, Aug. 2009, pp. 13-15.

Vidal, et al., "Pursuit-Evasion Games with Unmanned Ground and Aerial Vehicles", retrieved on Nov. 24, 2010 at <<http://ieeexplore.ieee.org/stamp/stamp.jsp?tp=&arnumber=933069>>, IEEE, Proceedings of IEEE Intl Conference on Robotics and Automation, Seoul, Korea, May 2001, pp. 2948-2955.

Vogiatzis, et al., "Reconstructing relief surfaces", Elsevier Press, Image and Vision Computing, vol. 26, 2008, pp. 397-404.

Welch, et al., "Motion Tracking: No Silver Bullet, but a Respectable Arsenal", retrieved on Nov. 24, 2010 at <<http://ieeexplore.ieee.org/stamp/stamp.jsp?tp=&arnumber=1046626>>, IEEE Computer Society, IEEE Computer Graphics and Applications, vol. 22, No. 6, Nov. 2002, pp. 24-38.

Williams, et al., "Real-Time Slam Relocalisation", retrieved on Nov. 26, 2010 at <<http://www.robots.ox.ac.uk:5000/~lav/Papers/williams_etal_iccv2007/williams_etal_iccv2007.pdf>>, IEEE, Proceedings of Intl Conference on Computer Vision (ICCV), Rio de Janeiro, Brazil, Oct. 2007, pp. 1-8.

Wilson, et al., "Combining Multiple Depth Cameras and Projectors for Interactions on, Above, and Between Surfaces", retrieved on Nov. 29, 2010 at <<http://research.microsoft.com/en-us/um/people/awilson/publications/wilsonuist2010/Wilson%20UIST%202010%20LightSpace.pdf>>, ACM, Proceedings of Symposium on User Interface Software and Technology (UIST), New York, NY, Oct. 2010, pp. 273-282.

Wurm, et al., "OctoMap: A Probabilistic, Flexible, and Compact 3D Map Representation for Robotic Systems", Proceedings of Workshop on Best Practice in 3D Perception and Modeling for Mobile Manipulation (ICRA), Anchorage, Alaska, May 2010, 8 pages.

Yu, et al., "Monocular Video Foreground/Background Segmentation by Tracking Spatial-Color Gaussian Mixture Models", retrieved on Nov. 28, 2010 at <<http://research.microsoft.com/en-us/um/people/cohen/segmentation.pdf>>, IEEE, Proceedings of Workshop on Motion and Video Computing (WMVC), Feb. 2007, pp. 1-8.

Zach, et al., "A Globally Optimal Algorithm for Robust TV-L1 Range Image Integration", IEEE Proceedings of Intl Conference on Computer Vision (ICCV), 2007, pp. 1-8.

Zhou, et al., "Data-Parallel Octrees for Surface Reconstruction", IEEE Transactions on Visualization and Computer Graphics, vol. 17, No. 5, May 2011, pp. 669-681.

Zhou, et al., "Highly Parallel Surface Reconstruction", retrieved on Nov. 29, 2010 at <<http://research.microsoft.com/pubs/70569/tr-2008-53.pdf>>, Microsoft Corporation, Microsoft Research, Technical Report MSR-TR-2008-53, Apr. 2008, pp. 1-10.

"International Search Report", Mailed Date: Aug. 22, 2012, Application No. PCT/US2012020686, Filed Date: Jan. 9, 2012, pp. 9.

* cited by examiner

United States Patent US 8,587,583 B2

THREE-DIMENSIONAL ENVIRONMENT RECONSTRUCTION

BACKGROUND

Three-dimensional computer models of a real-world environment are useful in a wide variety of applications. For example, such models can be used in applications such as immersive gaming, augmented reality, architecture/planning, robotics, and engineering prototyping.

Depth cameras (also known as z-cameras) can generate real-time depth maps of a real-world environment. Each pixel in these depth maps corresponds to a discrete distance measurement captured by the camera from a 3D point in the environment. This means that these cameras provide depth maps which are composed of an unordered set of points (known as a point cloud) at real-time rates.

However, generating a useful 3D model of the environment using the depth maps provided by a depth camera is complex. With many depth cameras, each individual depth map is of too low resolution and has too high noise to generate a sufficiently accurate and detailed 3D model. Furthermore, many applications utilize a surface reconstruction of the sensed environment rather than point clouds. For example, a 3D reconstructed surface model can be used in a physics simulation to model the effect of physical interactions between virtual objects and real objects sensed in the environment by the depth camera. A point cloud does not work well in this scenario because there are holes throughout the model, due to the lack of connectivity between the individual points in the point cloud.

To infer surface geometry by combining multiple frames of point clouds from the depth camera into a coherent, usable model and determining the connectivity between points in these point clouds is computationally very intensive. Surface reconstruction is the process of extracting the surfaces visible to the camera by inferring this connectivity. Given the amount of data being received in real-time from the depth camera and the desire to support interactive rates, known algorithms such as Poisson surface reconstruction are too computationally expensive to support real-time processing.

The embodiments described below are not limited to implementations which solve any or all of the disadvantages of known 3D reconstruction techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Three-dimensional environment reconstruction is described. In an example, a 3D model of a real-world environment is generated in a 3D volume made up of voxels stored on a memory device. The model is built from data describing a camera location and orientation, and a depth image with pixels indicating a distance from the camera to a point in the environment. A separate execution thread is assigned to each voxel in a plane of the volume. Each thread uses the camera location and orientation to determine a corresponding depth image location for its associated voxel, determines a factor relating to the distance between the associated voxel and the point in the environment at the corresponding location, and updates a stored value at the associated voxel using the factor. Each thread iterates through an equivalent voxel in the remaining planes of the volume, repeating the process to update the stored value.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer gaming system, the system described is provided as an example and not a limitation. As those skilled in the art will appreciate, the present examples are suitable for application in a variety of different types of computing systems using 3D models.

Figure 1:
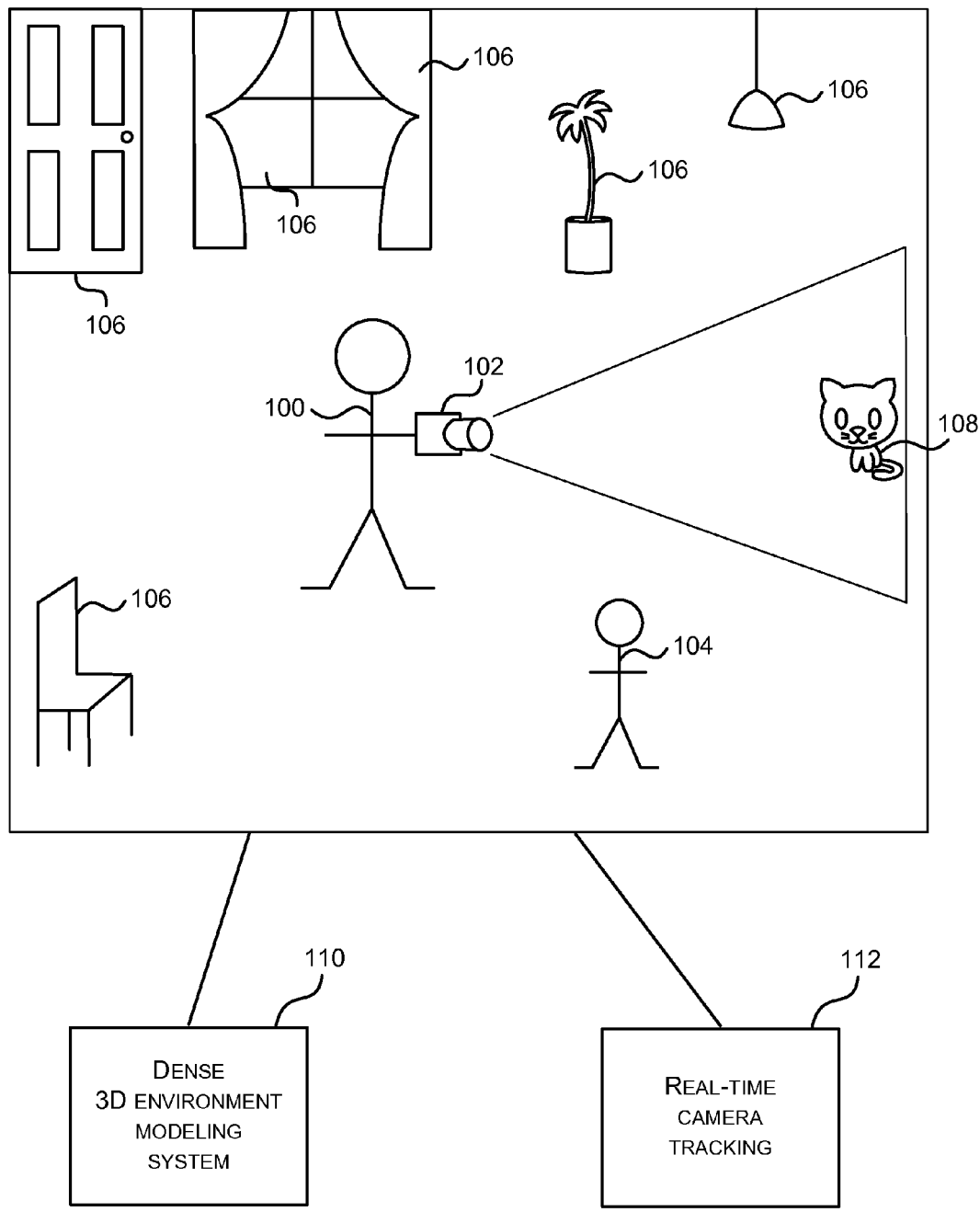
FIG. 1 illustrates a schematic diagram of a person in a room holding a mobile depth camera which may be used to generate a 3D model or map of the room.

FIG. 1 is a schematic diagram of a person 100 standing in a room and holding a mobile depth camera 102. The room contains various objects 106 such as a chair, door, window, plant, light, another person 104, and a cat 108. Many of the objects 106 are static although some of the objects such as the person 104 and cat 108 may move. As the person moves around the room, the mobile depth camera captures depth images of the room and the objects.

The mobile depth camera 102 is in communication with a dense 3D environment modeling system 110 (the environment in this case is the room). "Dense" in this example refers to a high degree of accuracy and resolution of the model resulting from the use of all or many of the points from the incoming depth maps to implicitly describe the surface. This can be contrasted with a "sparse" model that only takes a subset of the points to speed up calculations and reduce memory footprint. For example, images captured by the mobile depth camera 102 are used to form and build up a dense 3D model of the environment as the person moves about the room.

A real-time camera tracking system 112 monitors the location and orientation of the camera in the room. The real-time camera tracking system 112 may be integral with the mobile depth camera 102 or may be at another location provided that it is able to receive communication from the mobile depth camera 102, either directly or indirectly. For example, the real-time camera tracking system 112 may be provided at a personal computer, dedicated computer game apparatus, or other computing device in the room and in wireless communication with the mobile depth camera 102. In other examples the real-time camera tracking system 112 may be elsewhere in the building or at another remote location in communication with the mobile depth camera 102 using a communications network of any suitable type.

The real-time camera tracking system 112 provides input to the dense 3D modeling system, in order to allow individual depth images to be built up into an overall 3D model. The real-time camera tracking system 112 may also track the position of the camera in relation to the 3D model of the environment. The combination of camera tracking and 3D modeling is known as simultaneous localization and mapping (SLAM). Note that in further examples, mapping and localization can also be performed independently (i.e. not using a SLAM system) for example by using a camera positioning technique that is independent of the mapping.

The outputs of the real-time camera tracking system 112 and dense 3D modeling system 110 may be used by a game system or other application, although that is not essential. For example, modeled real-world objects can be included in a gaming environment. In another example, a projector at the mobile depth camera 102 may be arranged to project images depending on the output of the real-time camera tracking system 112 and 3D modeling system 110.

Figure 2:
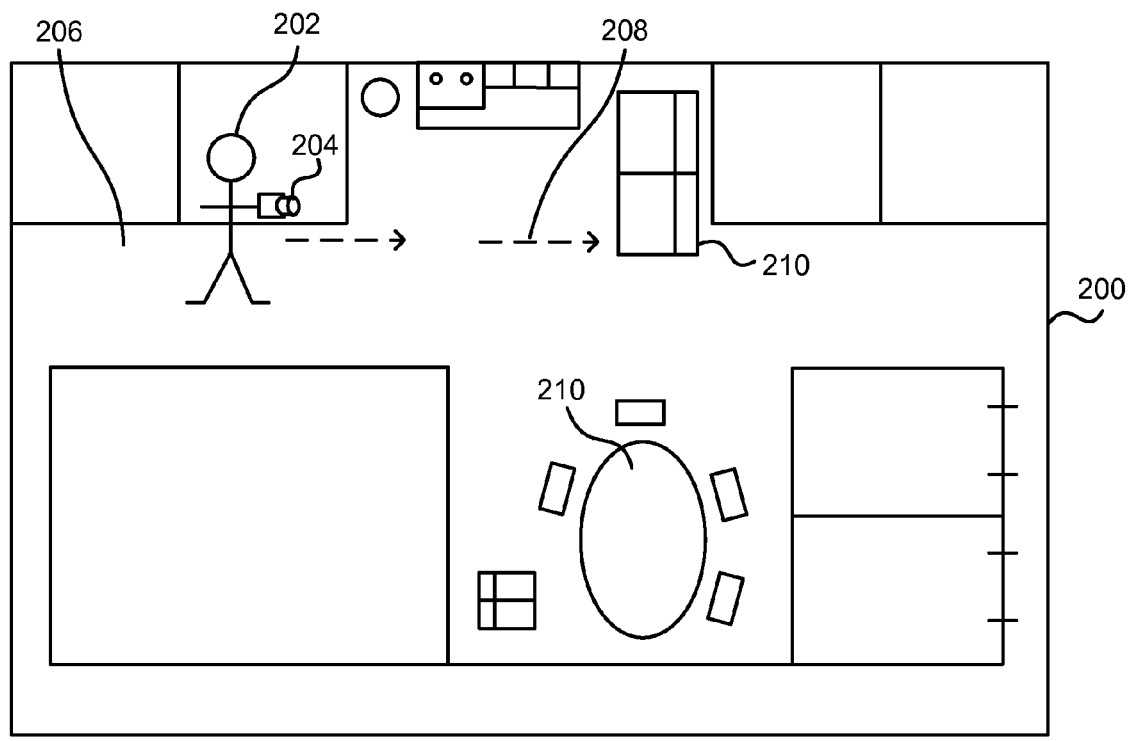
FIG. 2 illustrates a plan view of a floor of a building which is being explored by a person holding a mobile depth camera.

As a further example, FIG. 2 illustrates a plan view of a floor 200 of a building. A person 202 holding a mobile depth camera 204 is moving around the floor as indicated by dotted arrows 208. The person walks along a corridor 206 past rooms and furniture 210. The real-time camera tracking system 112 is able to track the position of the mobile depth camera 204 as it moves and the 3D modeling system generates a 3D model or map of the floor. It is not essential for a person 202 to carry the mobile depth camera 204. In other examples the mobile depth camera 204 is mounted on a robot or vehicle. This also applies to the example of FIG. 1.

Figure 3:
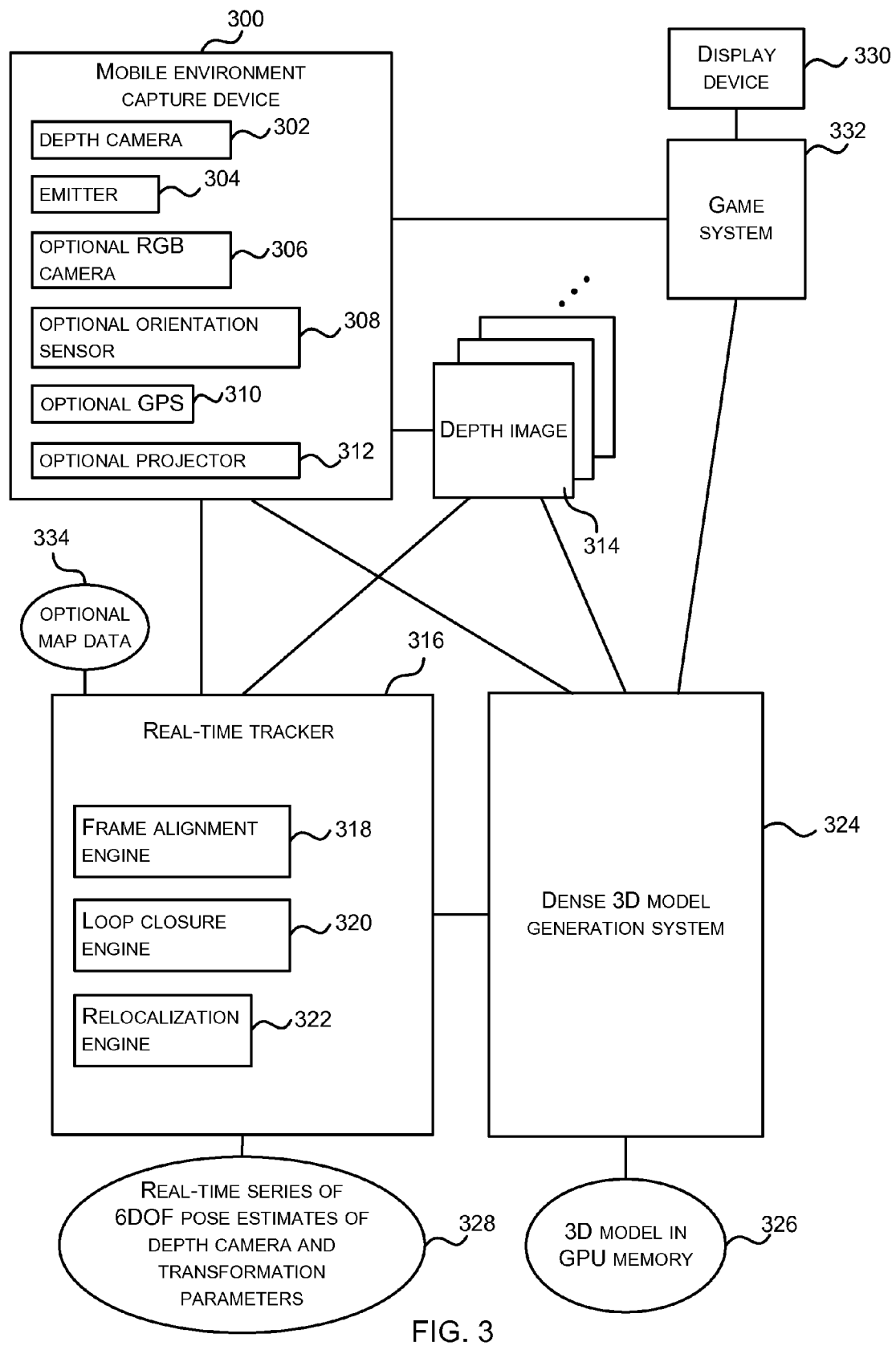
FIG. 3 illustrates a schematic diagram of a mobile depth camera connected to a real-time camera tracking system, a dense 3D model formation system and a game system.

FIG. 3 is a schematic diagram of a mobile environment capture device 300 for use with a real-time camera tracker 316, dense model formation system 324 and optionally a game system 332. The mobile environment capture device 300 comprises a depth camera 302 which is arranged to capture sequences of depth images of a scene. Each depth image 314 (or depth map frame) comprises a two dimensional image in which each image element (i.e. pixel) comprises a depth value such as a length or distance from the camera to an object in the captured scene which gave rise to that image element. This depth value may be an absolute value provided in specified units of measurement such as meters, or centimeters or may be a relative depth value. In each captured depth image 314 there may be around 300,000 or more image elements each having a depth value. The frame rate of the depth camera 302 is high enough to enable the depth images to be used for working robotics, computer game or other applications. For example, the frame rate may be in the range of 20 to 100 frames per second.

The depth information may be obtained using any suitable technique including, but not limited to, time of flight, structured light, and stereo images. The mobile environment capture device 300 may also comprise an emitter 304 arranged to illuminate the scene in such a manner that depth information may be ascertained by the depth camera 302.

For example, in the case that the depth camera 302 is an infra-red (IR) time-of-flight camera, the emitter 304 emits IR light onto the scene, and the depth camera 302 is arranged to detect backscattered light from the surface of one or more objects in the scene. In some examples, pulsed infrared light may be emitted from the emitter 304 such that the time between an outgoing light pulse and a corresponding incoming light pulse may be detected by the depth camera and measure and used to determine a physical distance from the environment capture device 300 to a location on objects in the scene. Additionally, in some examples, the phase of the outgoing light wave from the emitter 304 may be compared to the phase of the incoming light wave at the depth camera 302 to determine a phase shift. The phase shift may then be used to determine a physical distance from the mobile environment capture device 300 to a location on the objects by analyzing the intensity of the reflected beam of light over time via various techniques including, for example, shuttered light pulse imaging.

In another example, the mobile environment capture device 300 can use structured light to capture depth information. In such a technique patterned light (e.g. light displayed as a known pattern such as spots, a grid or stripe pattern, which may also be time-varying) may be projected onto a scene using the emitter 304. Upon striking the surface of objects in the scene the pattern becomes deformed. Such a deformation of the pattern is captured by the depth camera 302 and analyzed to determine an absolute or relative distance from the depth camera 302 to the objects in the scene.

In another example, the depth camera 302 comprises a pair of stereo cameras such that visual stereo data is obtained and resolved to generate relative depth information. In this case the emitter 304 may be used to illuminate the scene or may be omitted.

In some examples, in addition to the depth camera 302, the mobile environment capture device 300 comprises a color video camera referred to as an RGB camera 306. The RGB camera 306 is arranged to capture sequences of images of the scene at visible light frequencies.

The mobile environment capture device 300 may comprise an orientation sensor 308 such as an inertial measurement unit (IMU), accelerometer, gyroscope, compass or other orientation or movement sensor 308. However, it is not essential to use an orientation or movement sensor. The mobile environment capture device 300 may comprise a location tracking device such as a GPS, although this is not essential.

The mobile environment capture device may comprise a projector 312 as mentioned above, although this is not essential. The mobile environment capture device also comprises one or more processors, a memory and a communications infrastructure as described in more detail below. The mobile environment capture device may be provided in a housing which is shaped and sized to be hand held by a user or worn by a user. In other examples the mobile environment capture device is sized and shaped to be incorporated or mounted on a vehicle, toy or other movable apparatus.

The mobile environment capture device 300 is connected to a real-time tracker 316. This connection may be a physical wired connection or may use wireless communications. In some examples the mobile environment capture device 300 is connected indirectly to the real-time tracker 316 over one or more communications networks such as the internet.

The real-time tracker 316 is computer-implemented using a general purpose microprocessor controlling one or more graphics processing units (GPUs). It comprises a frame alignment engine 318 and optionally a loop closure engine 320 and a relocalization engine 322. The real-time tracker 316 takes depth image frames from the depth camera 302, and optionally also input from the mobile environment capture device 300, and optional map data 334. The real-time tracker 316 operates to place the depth image frames into spatial alignment in order to produce a real-time series 328 of six degree of freedom (6DOF) pose estimates of the depth camera 302. It may also produce transformation parameters for transforms between pairs of depth image frames. In some examples the real-time tracker operates on pairs of depth image frames from the depth camera. In other examples, the real-time tracker 316 takes a single depth image 314 and aligns that with a dense 3D model 326 of the environment rather than with another depth image.

The real-time tracker 316 provides the camera pose as output to a dense 3D model generation system 324 which uses that information together with the depth image frames to form and store a dense 3D model 326 of the scene or environment in which the mobile environment capture device 300 is moving. This is described in more detail with reference to FIGS. 4 to 6 below. For example, in the case of FIG. 1 the 3D model would be a 3D model of the surfaces and objects in the room. In the case of FIG. 2 the 3D model would be a 3D model of the floor of the building. The dense 3D model may be stored in GPU memory, as described below. The dense 3D model may be constructed in real-time, or the dense 3D model generation system 324 may collect the data on the camera pose and depth images and construct the 3D model at a later time.

The mobile environment capture device 300 may be used in conjunction with a game system 332 which is connected to a display device 330. For example, the game may be a FPS game, golf game, boxing game, motor car racing game or other type of computer game. The dense 3D model may be provided to the game system 332, and aspects of the model incorporated into the game. For example, the 3D model can be used to determine the shape and location of objects in a room, which can be used with camera-based games to improve background removal or incorporated into the game itself (e.g. as in-game objects that the player can interact with). Data from the game system 332 such as the game state or metadata about the game may also be provided to the real-time tracker 316.

In order to assist the user with building the dense 3D model, feedback can be provided to the user in the form of real-time renderings of the dense 3D model. This enables the user to view the state of the dense model as it is constructed, thereby assisting the user in capturing regions that have been missed. This provides a more interactive experience for the user. An example technique for rendering a view from the dense 3D model is discussed below with reference to FIG. 7. Audio or visual cues can also be provided to the user to guide them to areas that have been missed or are of poor quality in the dense 3D model.

Map data 334 is optionally available to the real-time tracker 316. For example, this may be an architect's drawing of the environment (e.g. room or floor of building), the location of landmarks known in the environment, a map of the environment available from another source.

The frame alignment engine 318 of the real-time tracker is arranged to align pairs of depth image frames, or a depth image frame and an estimate of a depth image frame from the dense 3D model. It uses an iterative process which is implemented using one or more graphics processing units in order that the frame alignment engine operates in real-time. The loop closure engine 320 is arranged to detect when the mobile environment capture device has moved in a loop so that the scene depicted in the current depth frame is at least partially overlapping with that of a previous depth frame that has been integrated into the model. For example, this may occur when a user walks around the whole floor of the building in FIG. 2 and reaches the starting point again. It may also occur when a user moves around a room behind some furniture and out again to the original start position, or close to that original start position. The relocalization engine 322 is arranged to deal with the situation where the real-time tracker loses the current location of the mobile environment capture device 300 and relocalizes or finds the current location again.

As mentioned, the processing performed by the real-time tracker 316 and/or the dense 3D model generation system 324 can, in one example, be executed remotely from the location of the mobile environment capture device 300. For example, the mobile environment capture device 300 can be connected to (or comprise) a computing device having relatively low processing power, and which streams the depth images over a communications network to a server. The server has relatively high processing power, and performs the computationally complex tasks of the real-time tracker 316 and/or the dense 3D model generation system 324. The server can return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device.

In a further example, the processing can be divided between local and remote computing devices. For example, the depth images can be transmitted over a communication network to a server in order to construct a high-resolution dense 3D model, which is returned on completion of the model, as described above. Concurrently with this, a low-resolution version of the model is constructed locally, using less processing power and memory, which is used to render a real-time view of the model for viewing by the user. This enables the user to get visual feedback from the model construction from a local processor, avoiding network latency issues.

Figure 4:
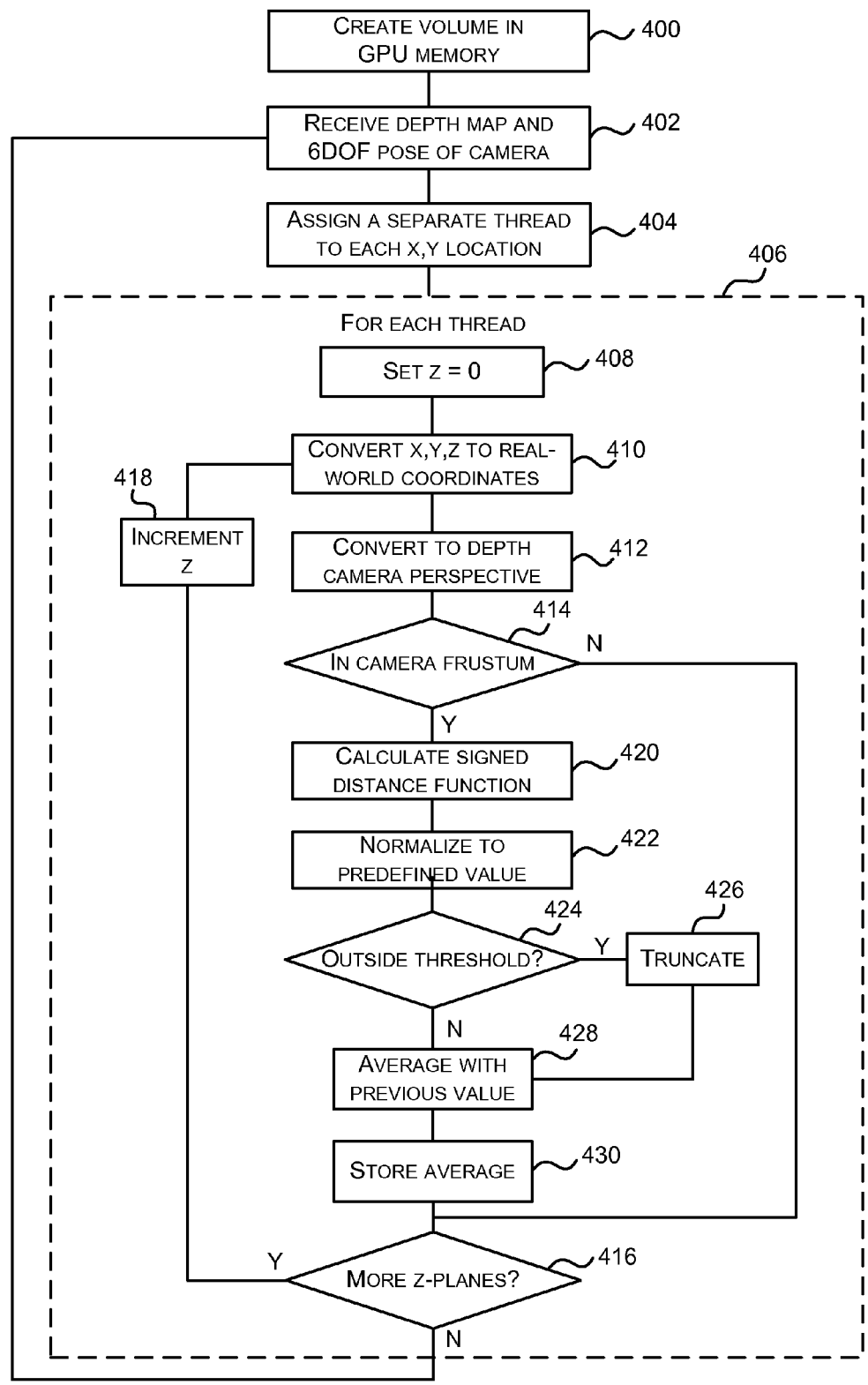
FIG. 4 illustrates a flowchart of a parallelizable process for generating a 3D environment model.

Reference is now made to FIG. 4, which illustrates a flowchart of a parallelizable process for generating a 3D environment model. In one example, the process of FIG. 4 is executed on a GPU processor, a multi-core processor, or other type of processor allowing a high degree of execution parallelism. In a further example, a single-core processor can also be used, if it is sufficiently fast. Firstly, a 3D volume is created 400 on a memory device for storing the model. In one example, the 3D volume is created on the memory of a graphics processing system, which enables fast, parallel access from a GPU.

The 3D volume can be visualized as a cuboid of memory, wherein each memory location is a voxel representing a point in space of the environment being modeled. Therefore, the 3D volume directly represents a spatial portion of the real-world environment. As the 3D volume corresponds directly to a real-world volume, the size of the real-world volume represented in a fixed-size memory determines the model resolution. For example, if a large real-world volume is to be modeled, then each voxel of the memory represents a larger region in real-world space, and hence the resolution is lower than if a smaller real-world volume is modeled. If more memory is available, however, the large real-world volume can be modeled at a higher resolution. Efficient data storage strategies and/or compression algorithms can also be used to reduce memory footprint and increase spatial resolution.

Figure 5:
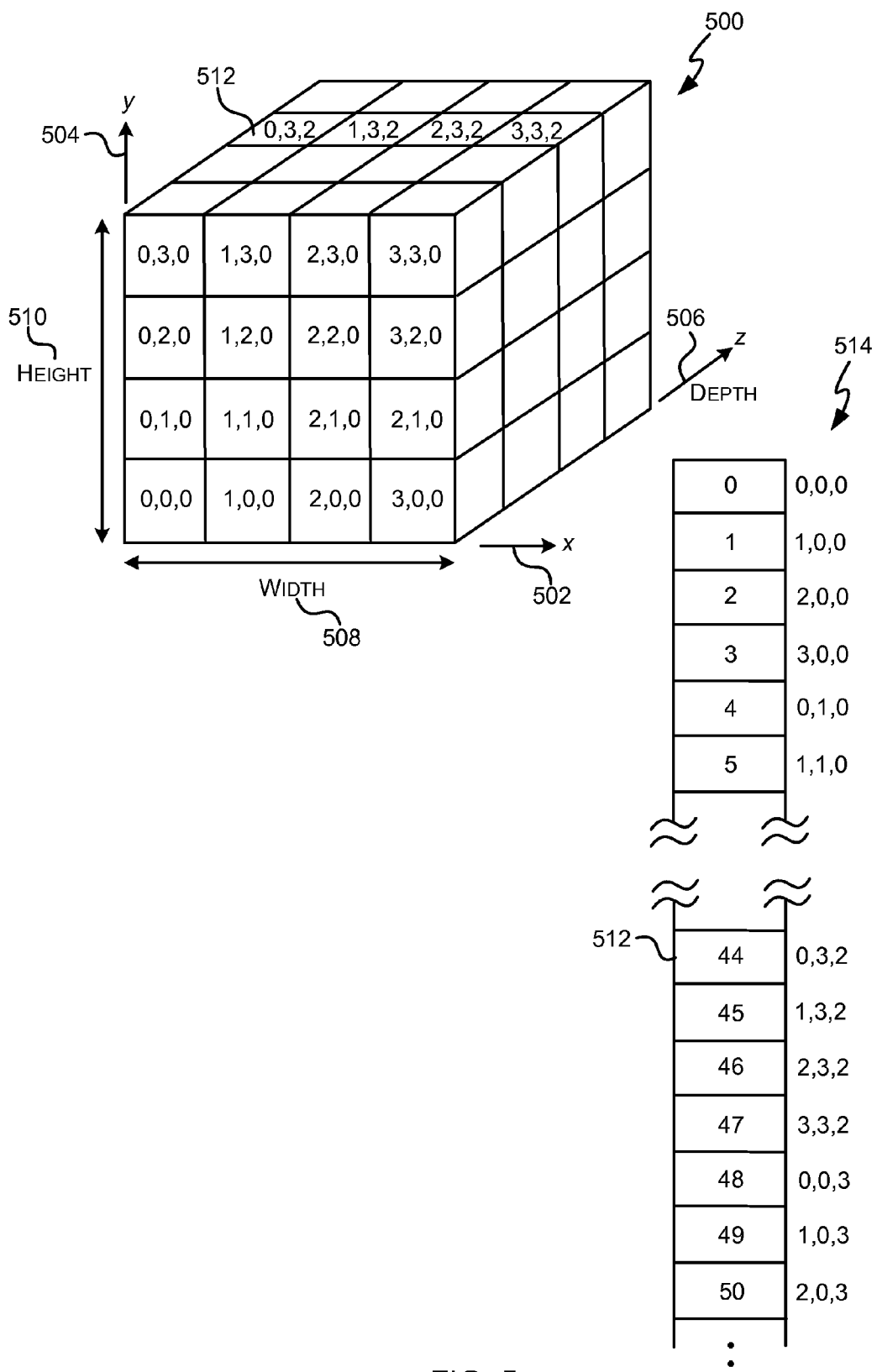
FIG. 5 illustrates a 3D volume constructed of linear pitched memory.

FIG. 5 illustrates an example of how the 3D volume can be constructed in the GPU memory. FIG. 5 shows an example 4×4×4 3D volume 500. This is merely an illustrative example, and actual 3D volumes can be larger or smaller. The 3D volume has an x-axis 502, y-axis 504, and z-axis 506. The number of voxels along the x-axis 502 defines the volume width 508 (four in this example), and the number of voxels along the y-axis 504 defines the volume height 510 (also four in this example). Individual voxels can then be identified using x, y, z coordinates. For example, voxel 512 has coordinates (0,3,2). Because the relationship between the 3D volume and the size of the real-world volume that it is representing is known, voxels in the 3D volume can have their location converted between 3D volume coordinates and real-world coordinates.

However, the physical memory device used to store the model is not generally arranged as a cuboid such as that illustrated in FIG. 5. Instead, the memory device generally comprises a linear array of memory locations, such as memory array 514. To create the 3D volume on a memory array, each voxel is mapped to a memory array index by: x+(y×width)+(z×width×height). For example, for the voxel 512 having coordinates (0,3,2) this translates to an index of 44, as illustrated in FIG. 5. This arrangement is called linear pitched memory, and provides fast, parallel access to the data stored on the GPU memory, as described below. The data stored in the memory can also be aligned such that the storage addresses of the data is spaced in power-of-two strides, for example by padding out the data to align with these boundaries. This enables processing to be performed on the data without the use of a generic multiplication, thereby further increasing computational speed.

Note that, in alternative examples, the model can be stored in a different manner from a 3D volume such as that described above. For example, data structures such as octtrees can be used to further reduce memory consumption and speed up computations. Alternatively, a transfer function between 3D space and a lower dimensional representation can be applied to increase storage efficiency. An example of this type of transfer function is called "geometry images".

Returning again to FIG. 4, once the 3D volume has been created 400 in memory, then the modeling process starts by receiving 402 from the mobile environment capture device 300 a depth image 314 and the 6DOF pose estimate of the depth camera 302 when capturing that depth image. The 6DOF pose estimate indicates the location and orientation of the depth camera 302, and can be provided by the real-time tracker 316. In one example, the 6DOF pose estimate can be in the form of an $SE_3$ matrix describing the rotation and translation of the depth camera 302 relative to real-world coordinates. More formally, this transformation matrix can be expressed as:

$$T_k = \begin{bmatrix} R_k & t_k \\ 0^T & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3:=\{R, t|R\epsilon SO_3, t\epsilon^3\}$. Coordinates in the camera space (i.e. from the camera perspective) can be mapped to real-world coordinates by multiplying by this transformation matrix, and vice-versa by applying the inverse transform.

A separate execution thread can be assigned 404 to each voxel in a plane of the 3D volume 500. For example, if the plane of the volume is the z-plane, then an execution thread is assigned to each combination of x- and y-coordinate of the 3D volume. Considering the 3D volume of FIG. 5, this results in sixteen threads, assigned to the voxels having x, y coordinates of: (0,0); (1,0); (2,0); . . . (1,3); (2,3); (3,3).

Figure 6:
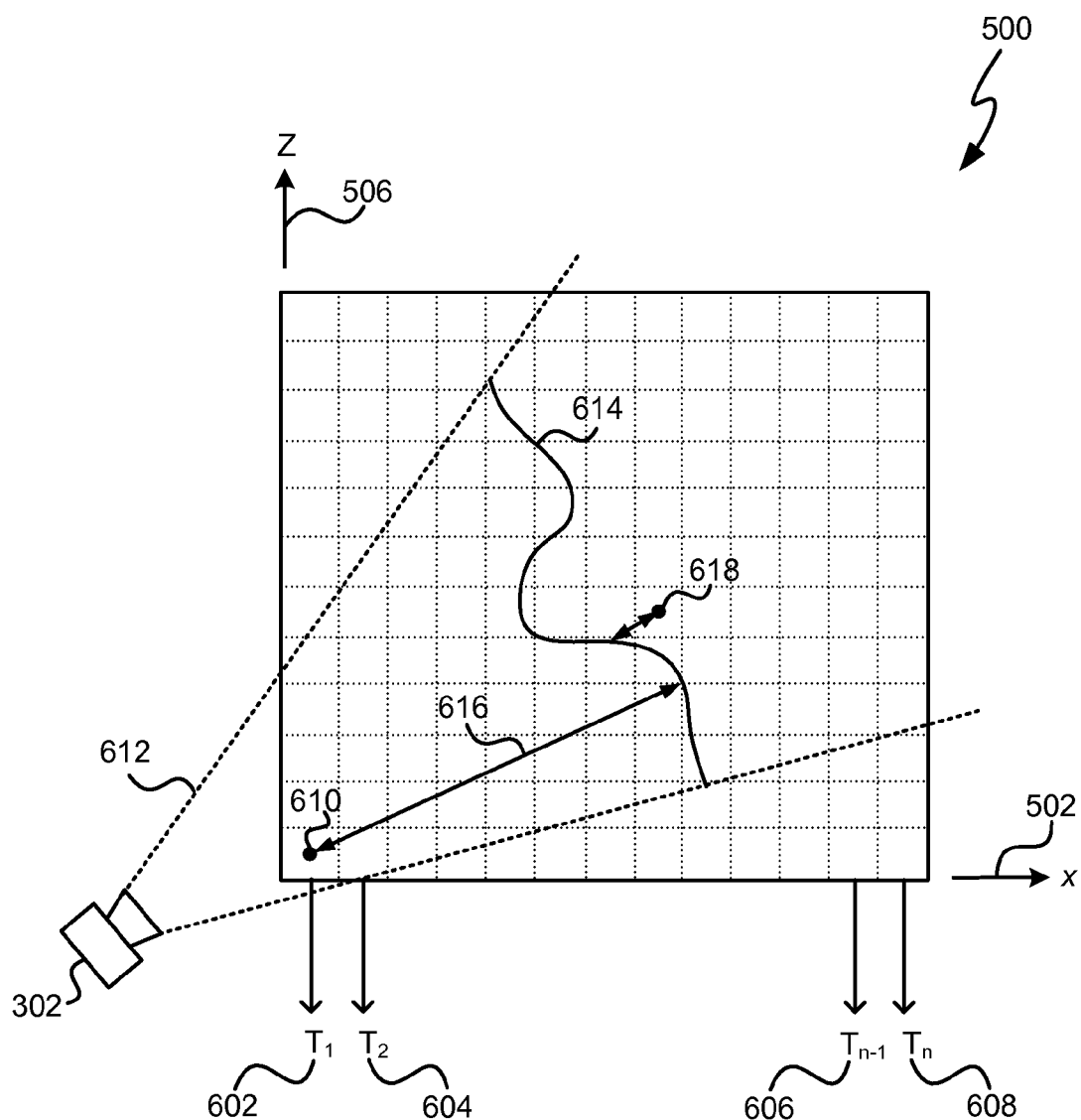
FIG. 6 illustrates an example parallelizable signed distance function calculation.

Each separate execution thread then performs the same operations, as indicated by box 406 in FIG. 4. The operations performed by each thread are illustrated diagrammatically in FIG. 6. FIG. 6 shows a top-down view of 3D volume 500 (i.e. showing the x-axis 502 and z-axis 506, and the y-axis is ignored for the purposes of clarity). An execution thread is assigned to each coordinate on the z-plane of the volume, denoted $T_1$ 602, $T_2$ 604, . . . $T_{n-1}$ 606, $T_1$ 608. The operations performed by each thread in box 406 are firstly illustrated with reference to $T_1$ 602.

The z-coordinate for the execution thread is set 408 to zero, and the x,y,z coordinates for the voxel associated with the thread are converted 410 to real-world coordinates. For example, in the case of thread $T_1$ 602, the x,y coordinate associated with the thread is (0,0), so when the z-coordinate is set to zero, this gives coordinates of (0,0,0) (i.e. voxel 610 in FIG. 6) which can be converted to real-world coordinates. Once the real-world coordinates for voxel 610 have been determined, they can be transformed using the 6DOF location and orientation of the depth camera to determine a corresponding location in the depth image 314 for this voxel. This means that the real-world coordinate for the current voxel associated with the thread is perspective projected through the depth camera's projection, and can take into account the intrinsic parameters of the camera (known as the projection matrix). In other words, if the voxel representing this point in the real-world is being viewed by the depth camera having its location and orientation, this determines what the coordinates are in the depth image 314 for that point. The depth camera-perspective coordinates for the voxel are denoted pX, pY, pZ. The depth camera-perspective coordinates can be converted to depth image pixel coordinates (denoted u,v) by u=pX/pZ and v=pY/pZ.

The perspective of the depth camera 302 is shown illustrated in FIG. 6 by the dashed lines indicating the frustum 612 of the depth camera 302. FIG. 6 also shows a surface 614 in the depth image 314 output from the depth camera.

The depth image coordinates (u,v) for the voxel currently associated with the thread are used to determine 414 whether the voxel is located within the frustum 612 of the depth camera. If not, then this voxel can be skipped. With reference to FIG. 6, it is noted that, in the case of thread $T_1$, the current voxel 610 is within the frustum 612 of the camera. This can be contrasted to, for example, the first voxel considered by thread $T_{n-1}$, which is outside the camera frustum 612, and hence skipped.

If it is determined that the current voxel is within the camera frustum 612, then a factor relating to the distance between the voxel and a point in the environment at the corresponding location to the voxel from the camera's perspective is determined. The point in the environment at the corresponding location can be given by the depth value in the depth image at (u,v). Therefore, with reference to FIG. 6, this factor considers distance 616 between voxel 610 and the point on surface 614 in the depth image 314 that maps onto the voxel 610.

In one example, the factor calculated 420 is a signed distance function, although any implicit surface representation can be applicable (e.g. one where the exact surface location can be determined by numerical methods and interpolation between a limited number of stored points on a regular grid). A signed distance function calculation gives the value of the distance between the current voxel and the corresponding point in the depth image 314, and is signed such that voxels outside (i.e. external to) the corresponding point in the depth image (from the camera's perspective) are given a positive distance, and voxels inside (i.e. internal to) the corresponding point in the depth image (from the camera's perspective) are given a negative distance. A value of zero indicates that the associated voxel is exactly coincident with the corresponding point. The signed distance function can be calculated readily from the depth value at (u,v) in the depth image minus pZ.

For example, voxel 610 in FIG. 6 is in front of the corresponding point on surface 614, and hence has a positive signed distance function value. Conversely, voxel 618 in FIG. 6 is behind its corresponding point on surface 614, and hence has a negative signed distance function value.

The signed distance function value is then normalized 422 to a predefined distance value. In one example, this predefined value can be a small distance such as 5 cm, although any suitable value can be used. For example, the normalization can be adapted depending on the noise level and the thickness of the object being reconstructed. This can be defined manually by the user, or derived automatically though analysis of the noise in the data. It is then determined 424 whether the normalized distance is greater than a positive threshold value (if the signed distance is positive) or less than a negative threshold value (if the signed distance is negative). If so, then the signed distance function values are truncated 426 to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function (TSDF).

For example, referring to FIG. 6, voxel 610 is a relatively large distance outside surface 614, and hence may be truncated to +1. Conversely, voxel 618 is a relatively short distance inside surface 614, and hence may not be truncated, and keep its normalized distance (e.g. −0.6 for example).

The normalized (and if appropriate, truncated) signed distance function value is then combined with any previous value stored at the current voxel. In the case that this is the first depth image incorporated into the 3D volume, then no previous values are present. However, as further frames from the depth camera are received and incorporated, then values can already be present at a voxel.

In one example, the signed distance function value is combined with a previous value by averaging 428. This can assist with building models of environments with moving objects, as it enables an object that has moved to disappear over time as the measurement that added it becomes older and averaged with more recent measurements. For example, an exponentially decaying moving average can be used. In another example, the average can be a weighted average that uses a weighting function relating to the distance of the associated voxel from the depth camera. The averaged signed distance function values can then be stored 430 at the current voxel.

In an alternative example, two values can be stored at each voxel. A weighted sum of the signed distance function values can be calculated and stored, and also a sum of the weights calculated and stored. The weighted average can then be computed as (weighted sum)/(sum of weights).

It is then determined 416 whether all the z-planes of the 3D volume have been considered by this thread. If not, then the z-coordinate is incremented 418, and the process repeats for the next voxel in the z direction. In other words, the thread starts to iterate through equivalent voxels (i.e. ones with the same x,y coordinate) along the z direction of the volume, determining the truncated signed distance function values and averaging them with previous values.

This is repeated until the thread has iterated through all the z-planes. This is performed by each thread, each of which is allocated to a different x,y coordinate on the z-plane. This sequence of one plane of the volume at a time has good memory access efficiency characteristics, for the memory layout in FIG. 5, since one z-plane corresponds to a small contiguous region of the linear pitched array. Hence, once this is completed by all threads the whole 3D volume has been analyzed, and a truncated signed distance function calculated for each voxel relative to the depth image 314. The process then waits for the next depth image frame from the depth camera to be received, and starts again, adding more values to the 3D volume where possible.

The result of this process is a 3D volume that comprises voxels having a averaged value between −1 and +1 (although note that this average value may be represented by multiple values such as the "weighted sum" and "sum of weights" values above). An averaged value of zero indicates that a surface in the environment is present at that location. Because multiple frames of depth images are added to the volume over time, the model stored in the volume is gradually built up in more and more detail. Repeated measurements of the same region of the environment add more detail and effectively increase the resolution of the information provided by the depth camera. Furthermore, noise is also effectively averaged out from the depth images, leaving a much smoother surface. This enables detail to be seen in the model that cannot be seen from an individual depth image.

The use of separate execution threads in this manner enables computationally efficient processing over the whole 3D volume. For example, GPU processors are arranged to efficiently execute parallel program threads, where each thread is performing the same operations. This enables the model generation process described above with reference to FIG. 4 to be performed in real-time, such that the model is constructed at the frame-rate of the depth camera.

Figure 7:
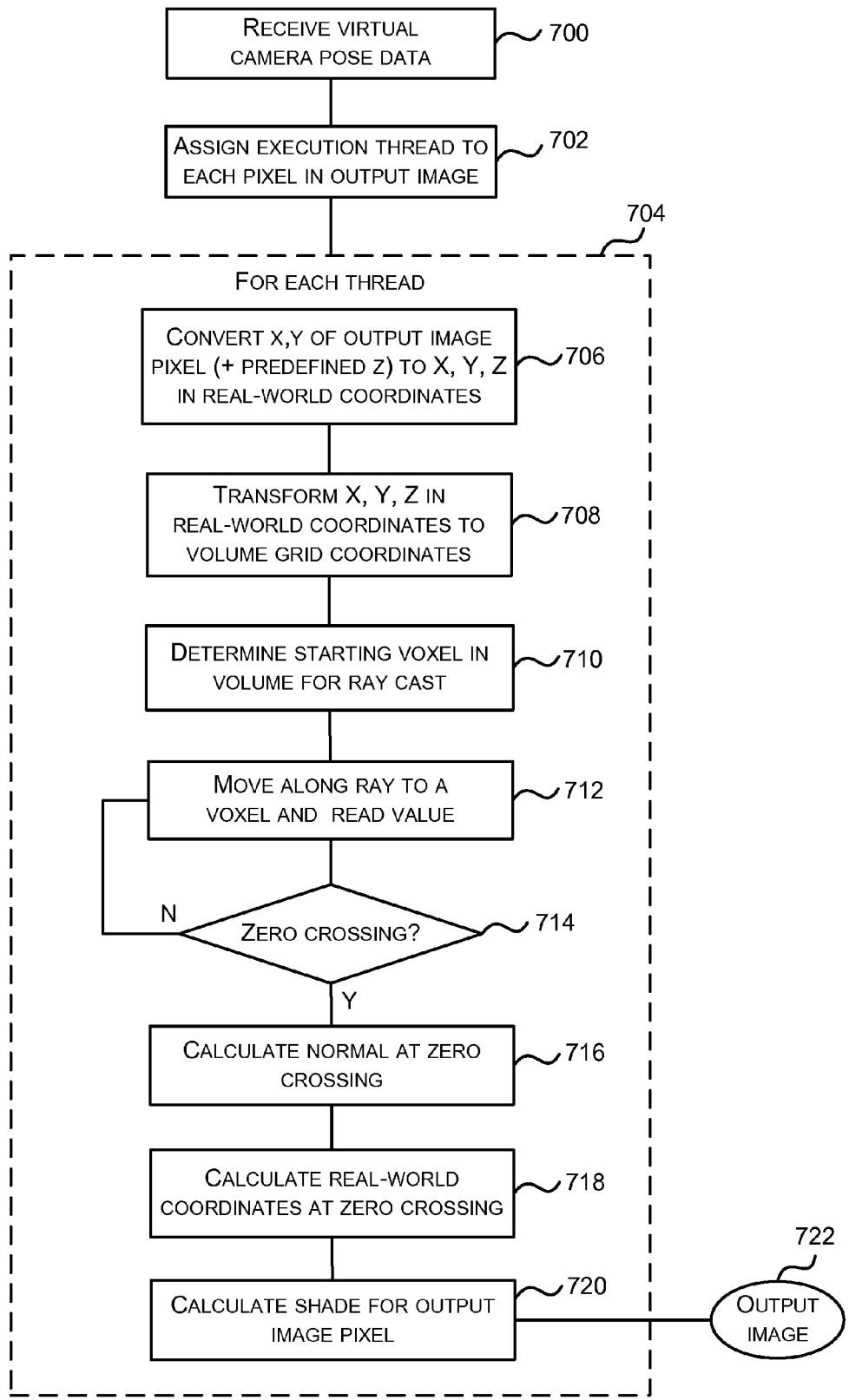
FIG. 7 illustrates a flowchart of a parallelizable process for raycasting from the 3D volume.

Once a model has been constructed in a 3D volume as described above, it can be utilized in a number of ways. For example, views of the model stored in the volume can be rendered using a raycasting technique, as shown in FIG. 7. The flowchart of FIG. 7 shows a parallelizable process for raycasting from the 3D volume, which is suited for execution on a GPU or multi-core CPU in a similar manner to the model generation process above.

To render a view of the model, a pose of a virtual camera defining the viewpoint for the image to be rendered is firstly received 700. This pose can be in the form of a 6DOF location and orientation of the virtual camera. A separate execution thread is then assigned 702 to each pixel in the image to be rendered.

The operations shows in box 704 are then performed by each execution thread to determine the value (e.g. shade, color etc.) to be applied to the thread's associated pixel. The x- and y-coordinates for the pixel associated with the thread are combined with a predefined initial z-value to give a 3D coordinate for the pixel, and the pose of the virtual camera is used to convert 706 this 3D x, y, z coordinate for the pixel into real-world coordinates, denoted X, Y, Z. The real-world coordinates X, Y, Z can then be transformed 708 into voxel coordinates in the 3D volume.

These coordinates define a point on a ray for the pixel having a path emanating from the virtual camera location through the 3D volume. It is then determined 710 which voxel in the 3D volume is the first touched by this ray, and this is set as the starting voxel for the raycasting. The raycasting operation moves 712 along the ray (from the starting voxel) and reads the averaged signed distance function values of the voxels touched by the ray, at each voxel determining 714 whether a zero-crossing in the voxel values has occurred (i.e. a sign change between the averaged signed distance function values stored in one voxel on the ray to the next voxel along the ray). Optionally, this can be arranged to determine the presence of a sign-change only from positive through zero to negative. This enables a distinction to be made between surfaces viewed from the front and surfaces viewed from "inside" the object.

When a zero-crossing is detected, this indicates the presence of a surface in the model (as described above). Therefore, this indicates the voxel at which the surface intersects the ray. A suitable linear interpolation technique can be used between the signed distance function values of the voxels on the ray either side of the zero crossing can be used to more precisely localize the zero crossing, and therefore the intersection with the zero-crossing surface. In one example, the surface intersection point along a ray can be computed using a simple linear interpolation given trilinearly sampled points either side of the detected zero crossing to find the point at which a zero occurs. At the point at which the zero-crossing occurs, a surface normal is calculated 716. This can be performed using the gradient from neighboring voxels. Linear interpolation can also be used to more accurately determine the gradient from neighboring voxels, and hence generate a more accurate surface normal. In one example, the surface normal can be computed using a backward difference numerical derivative, as follows:

$$\hat{n}(x) = \frac{\nabla f(x)}{\|\nabla f(x)\|}, \nabla f = \left[\frac{\partial f}{\partial x}, \frac{\partial f}{\partial y}, \frac{\partial f}{\partial z}\right]^T$$

Where $\hat{n}(x)$ is the normal for voxel x, and $f(x)$ is the signed distance function value for voxel x. This derivative can be scaled in each dimension to ensure correct isotropy given potentially arbitrary voxel resolutions and reconstruction dimensions.

The coordinates of the voxel at which the zero-crossing occurs are converted 718 into real-world coordinates, giving the real-world coordinates of the location of surface in the model. From the real-world coordinates of the surface, plus its surface normal, a shade and/or color can be calculated 720. The calculated shade and/or color can be based on any suitable shading model, and take into account the location of a virtual light source.

As mentioned, the operations in box 704 are performed by each execution thread in parallel, which gives a shade and/or color for each pixel in the final output image. The calculated data for each pixel can then be combined to give an output image 722, which is a rendering of the view of the model from the virtual camera.

The parallel nature of the above-described raycasting operation enables views of the 3D environment to be rendered in real-time. Execution of the raycasting operation on a GPU when the model is stored in a 3D volume in GPU memory is fast and computationally efficient.

The raycasting operation can also be further enhanced by employing an empty space skipping algorithm. Because each ray may touch hundreds of voxels along its path, it is beneficial to avoid wasting computational resources by analyzing empty voxels (i.e. those that do not contain any information on the model). In one example, to avoid analyzing every single voxel along a ray, if the value at a voxel is greater than a predefined value then more than one voxel along the ray is skipped. The number of voxels skipped and the predefined value can be defined to trade off efficiency versus raycast accuracy, provided that these parameters are selected using knowledge of the predefined distance value (controlling the normalization) discussed above to ensure that the zero-crossing is not missed due to the space-skipping.

In another example, space skipping can be performed by utilizing a multi-level data structure such as N-ary trees, e.g. octtrees. Here, at least one additional volume from the main 3D volume, with a lower resolution than the 3D volume, is generated. A low resolution volume can be analyzed first, to determine where along a ray there is empty space, and the main 3D volume can be analyzed for the parts of the ray that pass through non-empty voxels.

In further examples, the model stored in the 3D volume can be used to extract a polygon mesh representation of the environment. This can be achieved for example using the marching cubes algorithm, the marching tetrahedrons algorithm, the Bloomenthal Polygonizer, or any other suitable algorithm for selecting polygons representing portions of the model. A polygon representation of the model can be useful for physics-based applications or other applications that utilize a constant "water-tight" surface.

A polygon mesh can, in some examples, be a more storage-efficient way of representing the model, but cannot be updated as readily with new measurements from the depth camera. The polygon mesh can therefore be used to efficiently store a model after it has been created in the 3D volume from the depth camera. For example, a polygon mesh can be stored in a storage device such as CPU memory or on disk, rather than in GPU memory. In some examples, the models can be "cached" in polygon mesh form after construction, and converted back to signed distance function form as needed. For example, polygon meshes can be used to construct large models that cover a larger real-world area than can be fitted into the 3D volume memory. As a model is completed in the 3D volume for a certain real-world region it can be written out in polygon mesh form, and the 3D volume cleared to model a new real-world region, which can optionally be subsequently added to the polygon mesh. In some examples, the raycasting operation described above can be performed from the polygon mesh, rather than the 3D volume. In further examples, a view of the model can be generated from polygon mesh using an alternative technique such as a standard graphics rendering rasterizing pipeline.

A "cached" model stored as a polygon mesh can also be converted into a 3D model stored on the volume. For example, the stored, cached mesh model can be written back to the 3D volume as a "seed", to which further depth images can be added to further enhance the accuracy and detail of the model.

Note that, in some examples, any implicit surface representation might be applicable (e.g. one where the exact surface location can be determined by numerical methods and interpolation between a limited number of stored points on a regular grid).

Figure 8:
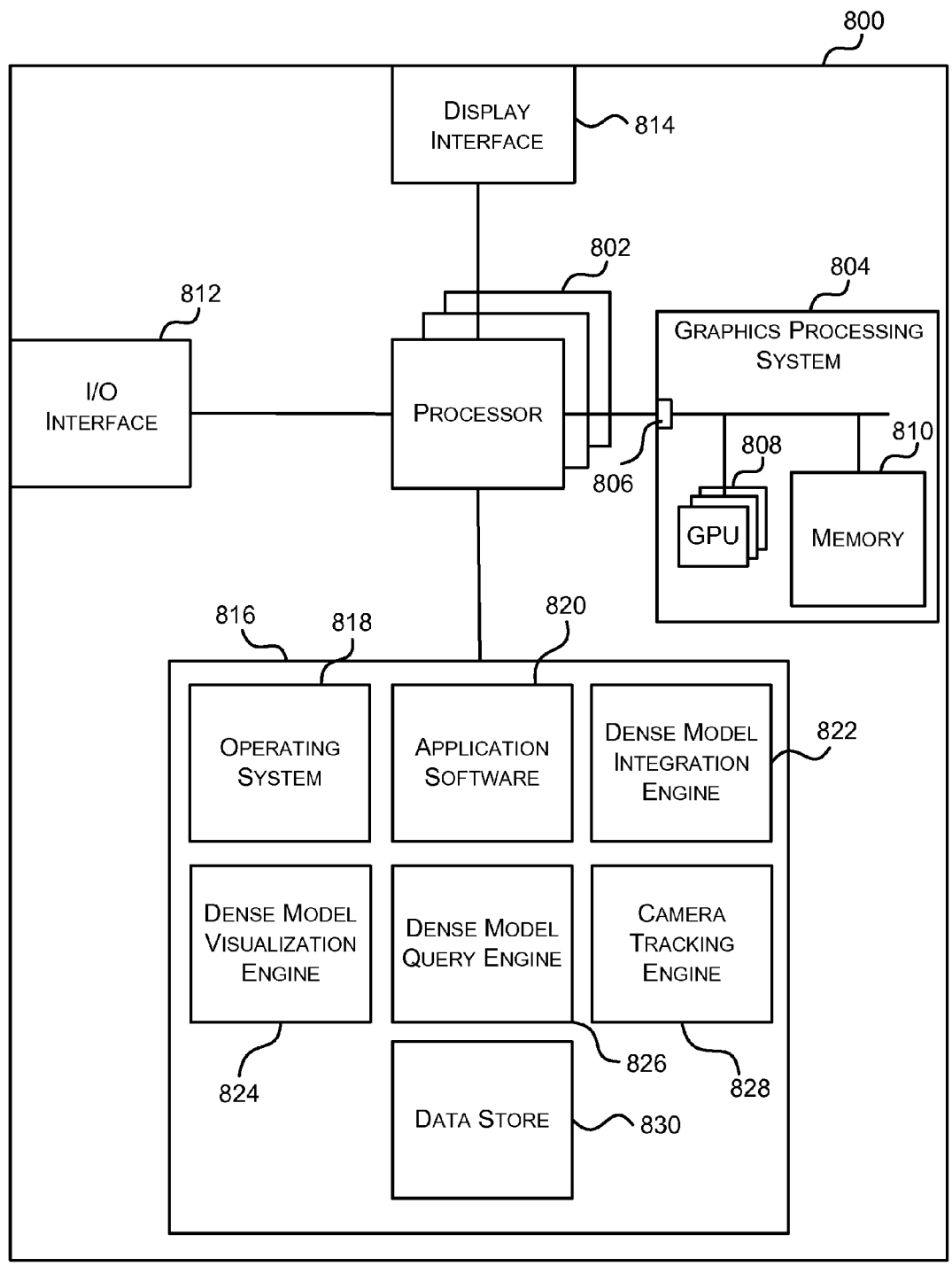
FIG. 8 illustrates an exemplary computing-based device in which embodiments of the parallelizable 3D modeling techniques may be implemented.

Reference is now made to FIG. 8, which illustrates various components of an exemplary computing-based device 800 which may be implemented as any form of a computing and/or electronic device, and in which embodiments of the above-described 3D environment modeling techniques may be implemented.

Computing-based device 800 comprises one or more processors 802 which may be microprocessors, controllers or any other suitable type of processors for processing computing executable instructions to control the operation of the device in order to perform 3D reconstruction. In some examples, for example where a system on a chip architecture is used, the processors 802 may include one or more fixed function blocks (also referred to as accelerators) which implement a part of the modeling methods in hardware (rather than software or firmware).

The computing-based device 800 also comprises a graphics processing system 804, which communicates with the processors 802 via a communication interface 806, and comprises one or more graphics processing units 808, which are arranged to execute parallel, threaded operations in a fast and efficient manner. The graphics processing system 804 also comprises a memory device 810, which is arranged to enable fast parallel access from the graphics processing units 808. In examples, the memory device 810 can store the 3D volume, and the graphics processing units 808 can perform the model generation and raycasting operations described above.

The computing-based device 800 also comprises an input/output interface 812 arranged to receive input from one or more devices, such as the mobile environment capture device (comprising the depth camera), and optionally one or more user input devices (e.g. a game controller, mouse, and/or keyboard). The input/output interface 812 may also operate as a communication interface, which can be arranged to communicate with one or more communication networks (e.g. the internet).

A display interface 814 is also provided and arranged to provide output to a display system integral with or in communication with the computing-based device. The display system may provide a graphical user interface, or other user interface of any suitable type although this is not essential.

The computer executable instructions may be provided using any computer-readable media that is accessible by computing based device 800. Computer-readable media may include, for example, computer storage media such as memory 816 and communications media. Computer storage media, such as memory 816, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 816) is shown within the computing-based device 800 it will be appreciated that the storage may be distributed or located remotely and accessed via a network or other communication link (e.g. using input/output interface 812).

Platform software comprising an operating system 818 or any other suitable platform software may be provided at the computing-based device to enable application software 820 to be executed on the device. The memory 816 can store executable instructions to implement the functionality of a dense model integration engine 822 (e.g. arranged to build up the model in the 3D model using the process described with reference to FIG. 4), a dense model visualization engine 824 (e.g. arranged to output a rendered image of the model using the raycasting process of FIG. 7), and a dense model query engine 826 (arranged to get data from the model, e.g. for constructing a polygon mesh). The memory 816 can also provide a data store 830, which can be used to provide storage for data used by the processors 802 when performing the 3D modeling techniques, such as for storing a polygon mesh.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of generating a 3D model of a real-world environment, comprising:
   creating a three-dimensional volume in a memory device for storing the model, the volume comprising a plurality of voxels;
   receiving data describing a location and orientation of a capture device and a depth image of at least a portion of the environment output from the capture device, the depth image comprising a plurality of pixels, each indicating a distance from the capture device to a point in the environment;
   assigning a separate execution thread to each voxel in a plane of the volume;
   each execution thread using the capture device location and orientation to determine a corresponding location in the depth image for its associated voxel, determining a factor relating to the distance between the associated voxel and the point in the environment at the corresponding location, and updating a stored value at the associated voxel using the factor; and
   each execution thread iterating through an equivalent voxel in each remaining plane of the volume and repeating the steps of determining the factor and updating the stored value for each voxel,
   wherein the step of updating the stored value at the associated voxel using the factor comprises summing the factor with a previous value stored at the associated voxel or wherein the step of determining the factor comprises calculating a signed distance function between the associated voxel and the point in the environment at the corresponding location, such that if the associated voxel is located at a first side of the point, then the factor has a positive value, and if the associated voxel is located at an opposite side of the point, then the factor has a negative value.

2. A method according to claim 1, further comprising the step of prior to determining the factor, determining whether the corresponding location is within the capture device frustum.

3. A method according to claim 1, wherein the volume is created on the memory device as linear pitched memory.

4. A method according to claim 1, wherein the step of using the capture device location and orientation to determine a corresponding location in the depth image for its associated voxel comprises:
   determining the location of the voxel in real-world coordinates;
   projecting the real-world coordinates through the capture device's projection using the location and orientation determine corresponding coordinates in the depth image for the associated voxel.

5. A method according to claim 1, further comprising the step of generating an image of the model for display on a display device using ray-casting.

6. A method according to claim 5, wherein the step of generating the image of the model comprises:
   receiving pose data for a virtual camera;
   assigning an execution thread to each image pixel;
   each image pixel execution thread determining a path of a ray emanating from the virtual camera through the associated pixel, transforming the path to coordinates in the volume, moving through the volume along the path until a voxel at a surface is detected, and calculating a shade for the associated pixel using the stored value at that voxel.

7. A method according to claim 1, further comprising the step of generating a polygon mesh from the model, and storing the polygon mesh at a storage device.

8. A method according to claim 7, wherein the step of generating a polygon mesh from the model comprises using a marching cubes algorithm to select polygons representing portions of the model.

9. A method according to claim 1, wherein the step of updating the stored value at the associated voxel using the factor comprises summing the factor with the previous value stored at the associated voxel.

10. A method according to claim 9, further comprising the step of determining a weighted average using the stored value and a weighting function relating to the distance of the associated voxel from the capture device.

11. A method according to claim 1, wherein the step of determining the factor comprises calculating the signed distance function between the associated voxel and the point in the environment at the corresponding location, such that if the associated voxel is located at the first side of the point, then the factor has the positive value, and if the associated voxel is located at the opposite side of the point, then the factor has the negative value.

12. A method according to claim 11, wherein the step of determining the factor further comprises: determining whether the factor is greater than a predefined positive threshold value, and, if so, truncating the factor to the positive threshold value; and determining whether the factor is less than a predefined negative threshold value, and, if so, truncating the factor to the negative threshold second value.

13. A method according to claim 12, wherein the positive threshold value is +1 and the negative threshold value is −1.

14. A method according to claim 11, wherein the factor has a value of zero when the associated voxel is coincident with the point in the environment.

15. A method according to claim 1, wherein the data describing the location and orientation of the capture device comprises a six degree-of-freedom pose for the capture device relative to real-world coordinates, and is determined by a transform aligning the depth image to a previously received depth image.

16. A graphics processing system for generating a 3D model of a real-world environment, comprising:
   a communication interface arranged to receive data describing a location and orientation of a capture device and a depth image of at least a portion of the environment output from the capture device, the depth image comprising a plurality of pixels, each indicating a distance from the capture device to a point in the environment;

a graphics processing unit arranged to provide concurrent execution of a plurality of threads; and a memory device, wherein the graphics processing unit is arranged to: create a three-dimensional volume in the memory device for storing the model, the volume comprising a plurality of voxels; assign a separate thread to each voxel in a plane of the volume; and, for each execution thread, use the capture device location and orientation to determine a corresponding location in the depth image for its associated voxel, determine a factor relating to the distance between the associated voxel and the point in the environment at the corresponding location, update a stored value at the associated voxel using the factor, and iterate through an equivalent voxel in each remaining plane of the volume and repeat the determination of the factor and update of the stored value for each voxel, wherein the graphics processing unit being arranged to update the stored value at the associated voxel using the factor includes the graphics processing unit being arranged to sum the factor with a previous value stored at the associated voxel or wherein the graphics processing unit being arranged to determine the factor includes the graphics processing unit being arranged to calculate a signed distance function between the associated voxel and the point in the environment at the corresponding location, such that if the associated voxel is located at a first side of the point, then the factor has a positive value, and if the associated voxel is located at an opposite side of the point, then the factor has a negative value.

17. A system according to claim 16, wherein the capture device is a video camera providing a plurality of depth images at a frame rate, and the graphics processing unit is further arranged to repeatedly update the stored value of each voxel in the volume at the frame rate.

18. A system according to claim 16, wherein the capture device comprises a depth camera.

19. A system according to claim 18, wherein the depth camera comprises at least one of: a structured light emitter; a time-of-flight camera; and a stereo camera.

20. One or more computer storage media, the one or more computer storage media being hardware, with device-executable instructions that, when executed by a graphics processing unit, direct the graphics processing unit to perform steps comprising: creating a three-dimensional volume in a memory device for storing a 3D model of a real-world environment, the volume comprising a plurality of voxels; receiving data describing a six degrees-of-freedom pose of a depth camera and a depth image of at least a portion of the environment output from the depth camera, the depth image comprising a plurality of pixels, each indicating a distance from the depth camera to a point in the environment; assigning a separate execution thread to each voxel in a plane of the volume; and concurrently executing each execution thread on the graphics processing unit, each execution thread performing steps comprising: using the depth camera pose to determine corresponding coordinates in the depth image for its associated voxel; calculating a truncated signed distance function from the distance between the associated voxel and the point in the environment at the corresponding coordinates of the depth image; updating a stored value at the associated voxel using the truncated signed distance function output; and iterating through an equivalent voxel in each remaining plane of the volume and repeating the steps of determining the factor and updating the stored value for each equivalent voxel.

* * * * *